United States Patent [19]
Möltgen et al.

[11] Patent Number: 5,478,510
[45] Date of Patent: Dec. 26, 1995

[54] PROCESS FOR PRODUCING HOMOGENEOUS STRUCTURE ABRASIVES

[75] Inventors: Paul Möltgen, Laufenburg; Martin Lütte, Murg; Karlheinz Glaisner, Bad Säckingen; Herbert Siebold, Görwihl, all of Germany

[73] Assignee: H.C. Starck GmbH & Co KG, Goslar, Germany

[21] Appl. No.: 138,391

[22] Filed: Oct. 18, 1993

[30] Foreign Application Priority Data

Oct. 19, 1992 [DE] Germany ............... 42 35 134.0
Mar. 5, 1993 [DE] Germany ............... 43 06 965.7

[51] Int. Cl.⁶ ............... B28B 7/04; C04B 35/60
[52] U.S. Cl. ............... 264/39; 264/140; 264/332
[58] Field of Search ............... 264/39, 140, 144, 264/332

[56] References Cited

U.S. PATENT DOCUMENTS 3,891,408  6/1975  Rowse et al. ............... 51/295
3,993,119  11/1976  Scott ............... 164/330
4,194,887  3/1980  Ueltz ............... 51/309

FOREIGN PATENT DOCUMENTS 0011583  5/1980  European Pat. Off. ......... C04B 35/60
2290266  6/1976  France .
1421174  6/1972  United Kingdom ............. B24D 3/00

*Primary Examiner*—Christopher A. Fiorilla
*Attorney, Agent, or Firm*—Jerry Cohen

[57] ABSTRACT

A process for the production of abrasive materials by pouring molten abrasive material into the spaces between plates of an assembly of moving cooling plates. The pour is followed by solidification and removal of the poured material (and size reduction of the removed material). The plates are maintained parallel and vertical throughout the pouring, solidification and removal steps, the latter being accomplished by separation of the plates by a conversion wheel. The motion of the plates is then reversed by the wheel to reassemble the plates for a new cycle of pour, solidification and removal.

6 Claims, 3 Drawing Sheets

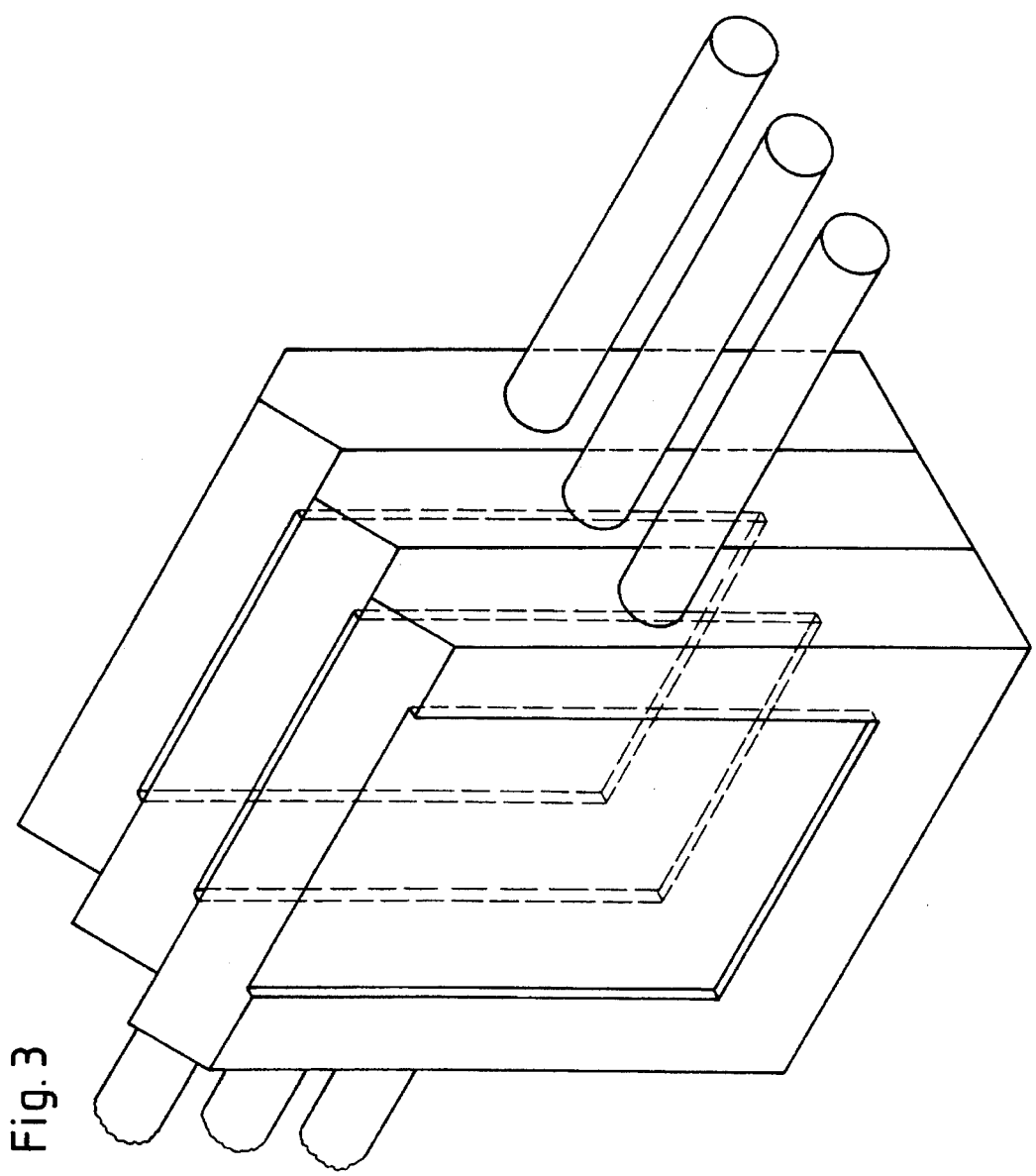

PROCESS FOR PRODUCING HOMOGENEOUS STRUCTURE ABRASIVES

BACKGROUND OF THE INVENTION

This invention relates to a process for the production of abrasive materials by pouring molten abrasive material into the spaces between an assembly of cooling plates consisting of cooling plates vertically arranged parallel to one another, solidification, removal and size reduction.

Processes for the rapid cooling of molten metal oxides have long been known. Thus, according to German Patent Document DE-A 22 27 642, this is done by pouring the molten material between cooling plates. In addition, German Patent Document DE-C 24 14 036 describes a process for the continuous production of an oxidic abrasive of controlled crystal size, in which a melt of the abrasive is poured off into wedge molds, several wedge molds being joined circularly together in the form of a star wheel to form a casting arrangement. The wedge shape of the molds prevents the solidified material from caking. However, it also causes an unwanted crystal size distribution. The described process is virtually impossible to carry out at constant temperatures because the casting arrangement naturally heats up to an increasing extent in operation.

A fine and homogeneous crystallite structure with a single particle size distribution, which is essential for a high grinding performance, cannot be obtained by the process according to German Patent Document DE-C 24 14 036.

U.S. Pat. No. 3,993,119 describes a process and an arrangement for continuously cooling metal oxides in which the liquid metal oxide is poured off through a casting hole into a narrow gap between vertically arranged cooling plates which are moved past beneath the casting hole in a tube. The plates are then moved slightly apart from one another outside the casting position so that the still hot material can be removed. One disadvantage of this process is that it is extremely difficult with the described arrangement to guarantee a uniform narrow gap between the plates. When the molds are emptied, pieces of material cannot be prevented from becoming wedged between the cooling plates. The gap in question is thus widened so that the cooling conditions are altered with the result that a homogeneous, finely crystalline structure can no longer be obtained. In addition, in the event of continuous operation of the casting arrangement described in U.S. Pat. No. 3,993,119, heating of the cooling plates cannot be avoided despite the cooling system provided. However, the quality of the cast product depends to a large extent on the temperature of the cooling plates, so that uniform quality cannot be guaranteed in the disclosed arrangement.

In addition, German Patent Documents DE-A 2 264 202 describes a process for the production of abrasive materials in which the molten abrasive material is cast between several metal or graphite plates spaced apart from one another and is solidified by cooling. However, uniform production conditions, more particularly the residence time of the abrasive material, are not guaranteed in this arrangement. Moreover, the solidified material is extremely difficult and expensive to remove.

The problem addressed by the present invention was to provide a process which would not have any of the described disadvantages of the prior art.

SUMMARY OF THE INVENTION

A process that satisfies these requirements has now been found. The process in question is a process for the production of abrasive materials by pouring molten abrasive material into the spaces between an assembly of cooling plates consisting of cooling plates vertically arranged parallel to one another, solidification, removal and size reduction, the molten material being poured into the spaces in such a way that the empty assembly of cooling plates is passed through continuously beneath the molten stream and over a reversing wheel, the plates being separated and at the same time emptied and then put back together to form the assembly. This process is the subject of the present invention.

BRIEF DESCRIPTION OF THE DRAWINGS

FIGS. 3 and 4 depict specific examples of cooling plates according to the invention.

DETAILED DESCRIPTION OF PREFERRED EMBODIMENTS

Figure 1:
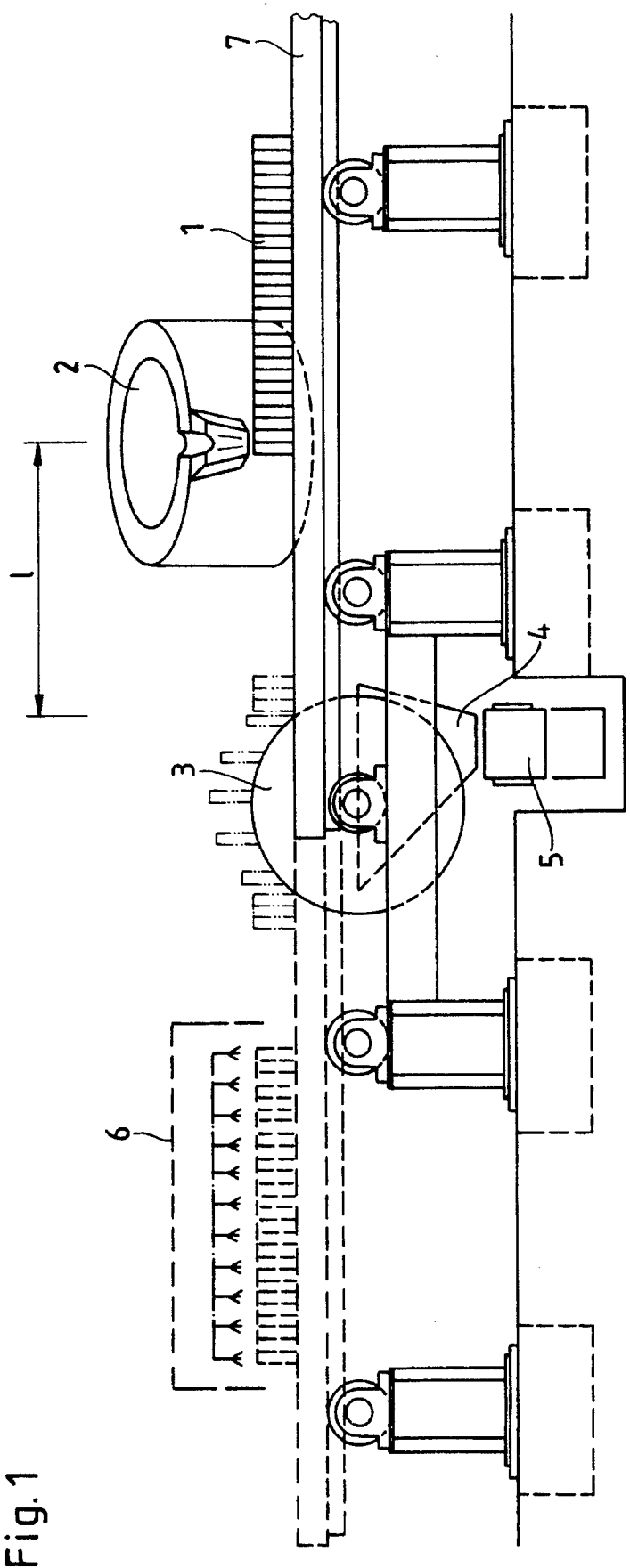
FIGS. 1 and 2 depict an apparatus used to carry out the invention.
Figure 2:
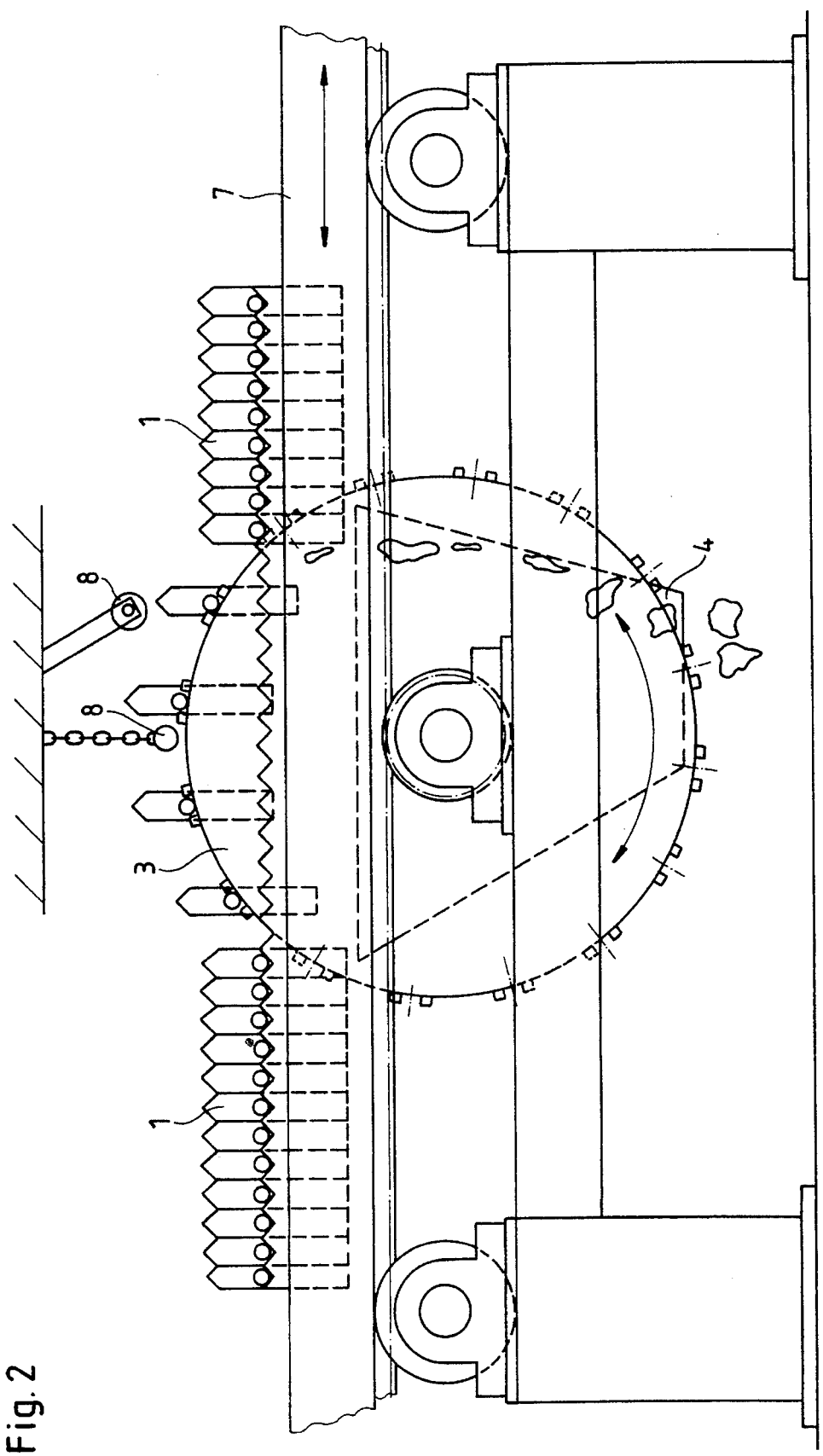

The process according to the invention is carried out, as shown in FIGS. 1–2, using an assembly (1) of cooling plates which are formed with a recess so that an upwardly open gap is formed between the individual cooling plates. The thickness of the cooling plates, which are preferably made of cast metal, steel, aluminium or graphite, should be selected in such a way as to guarantee rapid quenching of the melt. In the case of abrasive materials containing aluminium oxide, for the production of which the process according to the invention is particularly suitable, a plate thickness of 60 to 100 mm for a gap width of 3 to 7 mm is sufficient.

The recess in the cooling plates which determines the gap width may be present on one or both sides of the cooling plates.

The number of cooling plates is not limited and may be adapted to the capacity of the furnace. The size of the cooling plates may also be varied within certain limits, although it is of course of advantage to use large plates in the interests of economic operation.

However, it is difficult or even impossible beyond a certain plate size completely to fill the molds because the material solidifies before reaching the rim or the bottom of the molds.

The assembly of cooling plates is moved past the casting opening of a melting furnace (2), the liquid melt being poured continuously into the particular gap between the cooling plates. The temperature of the cooling plates has to be selected in such a way that the material is intensively quenched without the oxide melt solidifying so rapidly that the molds can no longer be completely filled. To this end, the cooling plates are cooled to a defined temperature, preferably to a temperature of 100° to 500° C., in a cooling zone (6) before the melt is poured in.

At a certain distance (1) from the casting station, the plate assembly with the filled molds is guided over a reversing wheel (3) which individually lifts the plates over a hopper so that the soldified product can be emptied from the molds. The distance (1) between the casting station and the reversing wheel (3) is selected in such a way that the time between pouring in and emptying is preferably 1 to 3 minutes.

The residence time between the cooling plates should be such that the solidifying melt is shielded from the oxidizing atmosphere, such as air or water or the like, until the temperature has fallen to such an extent that there can no longer be any reaction with the oxidizing environment. This of particular advantage for the production of aluminum oxide/zirconium oxide abrasives because the presence of reduction products has a favorable effect on their abrasive properties.

FIGS. 3 and 4 depict specific examples of cooling plates according to the invention. The plates shown in the figures have the following dimensions:

d=80 mm
s=5 mm,

The capacity of each mould is about 5–7 kg.

The fact that the individual moulds are emptied at a uniform rate is clear from FIG. 1, since each filled mould covers distance (1) within a precisely defined time (t) (due to the constant forward movement of the rack), so that the resistance time of the zirconium corundum between the cooling plates is the same for each mould. In practice this means that the first moulds of the assembly are already being emptied while the last moulds are still passing beneath the spout of the furnace in order to be filled.

The resistance time of the material between the plates is about 2 minutes for each mould.

The end product is subsequently transported, preferably by a conveyor belt (5), to further processing stations.

To prevent the solidified product from adhering to the cooling plates, it is of advantage to free the emptied spaces from adhering residues of the solidified abrasive material before the plates are put back together by means of rapping and/or stripping elements (8) in the region of the reversing wheel.

After passing the emptying station, the cooling plates are put back together to form an assembly and introduced into the cooling zone (6). The cooling zone advantageously consists of several nozzles arranged above the plate assembly. Water is preferably used as the cooling medium.

Apart from the residence time in the region of the reversing wheel, the cooling plates are fixedly arranged on a rack (7) so that a uniform mold width is guaranteed.

The casting process is over when the last mold of the plate assembly has passed the casting opening. The cooling process is not initiated until the entire plate assembly is in the cooling zone. This ensures that the same temperature prevails throughout the assembly within a certain tolerance range. As soon as the plate assembly has been cooled to the required temperature, it is returned via the reversing wheel to the starting position so that the next casting cycle can be started. Emptying takes place synchronously with the casting cycle apart from the time lag.

All physical parameters crucial to the quality of the cast metal oxide can be established with considerable precision by the process according to the invention. Thus, the metal oxide can be poured off in a uniformly thin layer. This ensures extremely rapid solidification and provides for an extremely fine crystal structure which continues homogeneously throughout the entire solidified melt.

Particularly good results are obtained by the process according to the invention when the abrasive material is zirconium corundum. A high percentage content of tetragonal zirconium oxide can be obtained in aluminium oxide/zirconium oxide abrasives which has been found by experience to have an advantageous effect on the performance of the corresponding abrasive material.

The following Example is intended to illustrate the invention without limiting it in any way.

EXAMPLE

A mixture of 58% $Al_2O_3$, 39% $ZrO_2$ and 1% $TiO_2$ was melted in the presence of carbon in an electric arc furnace. The melt was cooled by the arrangement according to the invention, the initial temperature of the cooling plates being adjusted to approx. 300° C., the gap between the plates to a width of 4 mm and the residence time of the cast melt between the cooling plates to approximately 2 minutes.

The abrasive material thus obtained had a homogeneous structure with an average primary crystallite size of approx. 0.2 μm. The percentage content of tetragonal $ZrO_2$ phase was approx. 80%, based on the total $ZrO_2$ content.

The material was size-reduced and made up into abrasive materials.

The materials obtained were tested against commercial zirconium corundum in abrasives on substrates in P 36 grit (FEPA Standard).

| Test 1: | | | |
| --- | --- | --- | --- |
| Load: | | 35 N | |
| Ground material: | | C 45 steel (solid material) | |
| Grinding interval: | | 5 minutes | |
| Grinding time: | | 60 minutes | |
| Abrasive material | Grit | Abrasion (g) | Performance (%) |
| Example | P 36 | 2618 | 107 |
| Commercial zironium corundum* | P 36 | 2437 | 100 |
| Test 2: | | | |
| Load: | | 35 N | |
| Ground material: | | 42 CrMo 4 steel | |
| Grinding interval: | | 2 minutes | |
| Grinding time: | | 30 minutes | |
| Abrasive material | Grit | Abrasion (g) | Performance (%) |
| Example | P 36 | 1082 | 118 |
| Commercial zirconium corundum* | P 36 | 920 | 100 |

*A product of Norton, USA

We claim:

1. In a process for the production of abrasive materials in repetitive cycles and within each such cycle pouring molten abrasive material between closely adjacent plates of an assembly of face-to-face cooling plates consisting of cooling plates vertically arranged parallel to one another, solidification of the molten abrasive material and, removal and size reduction thereof, characterized in that the assembly of cooling plates is passed over a conversion wheel after the pour and solidification, the plates being separated by the wheel to thereby be emptied of the solidified material to implement said removal step, cooling the plates to a selected temperature range and putting the cooling plates are back together to form the assembly in an initial pour position of the next cycle, and wherein the plates are maintained, substantially vertical and parallel during the pour and as they separate discharge pieces of solidified material, so that carryover of solidified material, from one cycle to a next cycle of the plates being put back together and a new pour, is thus avoidable, whereby uniformity is maintained from cycle to cycle.

2. A process as claimed in claim 1, characterized in that, before the molten abrasive material is poured between cooling plates, the cooling plates are cooled to a defined temperature in a cooling zone.

3. A process as claimed in claim 2 wherein the plates are cooled to a temperature in the range of 100°–500° C.

4. A process as claimed in claims 3, characterized in that the time between pouring in and emptying is 1 to 3 minutes.

5. A process as claimed in claims 1, or 2, characterized in that the emptied spaces are freed from adhering residues of the solidified abrasive material before reassembly 6. A process as claimed in claims 1, 2 or 3, characterized in that the abrasive material is zirconium corundum.

* * * * *